United States Patent [19]

Wideman et al.

[11] Patent Number: 5,246,998
[45] Date of Patent: Sep. 21, 1993

[54] DICYCLOPENTADIENE ALCOHOL ROSIN ACID DERIVATIVES

[75] Inventors: Lawson G. Wideman; Paul H. Sandstrom, both of Tallmadge; Denise J. Keith, Akron, all of Ohio

[73] Assignee: The Goodyear Tire & Rubber Company, Akron, Ohio

[21] Appl. No.: 873,258

[22] Filed: Apr. 24, 1992

[51] Int. Cl.$^5$ ............................................. C08L 93/04
[52] U.S. Cl. ................................. 524/275; 524/271; 524/272; 524/273; 524/274; 530/210; 530/215
[58] Field of Search ............... 524/270, 271, 272, 273, 524/274; 530/210, 215

[56] References Cited

U.S. PATENT DOCUMENTS

| | | | |
|---|---|---|---|
| 4,478,993 | 10/1984 | Wideman et al. | 527/600 |
| 4,491,655 | 1/1985 | Sandstrom | 524/274 |
| 5,021,492 | 6/1991 | Sandstrom et al. | 524/272 |

FOREIGN PATENT DOCUMENTS 0183760  10/1983  Japan ................................ 524/270

Primary Examiner—Paul R. Michl
Assistant Examiner—Peter Szekely
Attorney, Agent, or Firm—Bruce J. Hendricks

[57] ABSTRACT

The present invention relates to dicyclopentadiene alcohol resin acid derivatives which are useful as a rubber additive. In one embodiment, the ester linked rosin acid derivative may serve as a total or partial replacement for oil and/or wax. The dicyclopentadiene alcohol rosin acid derivatives are prepared by reacting abietic acid and/or dehydroabietic acid with dicyclopentadiene alcohol under esterification conditions.

12 Claims, No Drawings

DICYCLOPENTADIENE ALCOHOL ROSIN ACID DERIVATIVES

BACKGROUND OF THE INVENTION

Both natural and synthetic elastomers usually require the use of processing aids to assist mechanical breakdown and compounding. Materials such as mixtures of oil soluble sulfonic acids of high molecular weight with a high boiling alcohol, paraffin oils, blends of sulfonated petroleum products and selected mineral oils are conventionally used as processing aids. Additional examples include petroleum, paraffinic and vegetable oils, coal tar, petroleum residues or pitches and naturally occurring or synthetic resins.

One advantage in using processing aids is they assist the incorporation of fillers and other ingredients with low power consumption since they reduce internal friction in calendering and extrusion. By reducing the amount of friction during compounding, the temperature of the rubber will remain lower and thus minimize the possibility of scorch.

Various types of rosin acids have been used as extenders for high molecular weight SBR. See *Properties of GR-S Extended With Rosin Type Acids*, L. H. Howland, J. A. Reynolds, and R. L. Provost, Industrial and Engineering Chemistry, Vol. 45, No. 5, May 1953. Whereas reasonably good cured physical properties can be obtained with the rosin type acids, there are problems associated with their use which include cure retardation, high tack and poor low temperature performance, which limit their use as an extender in rubber formulations.

U.S. Pat. No. 4,478,993 discloses the use of decarboxylated rosin acid also known as thermal oil as a total or partial replacement for oil in a rubber formulation. Compared with the use of aromatic extending oils in rubbers, decarboxylated rosin acids provide comparable processing and low temperature performance and superior abrasive resistance.

SUMMARY OF THE INVENTION

The present invention relates to dicyclopentadiene alcohol rosin acid derivatives of the formula:

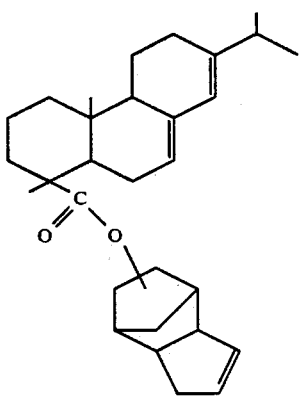

and

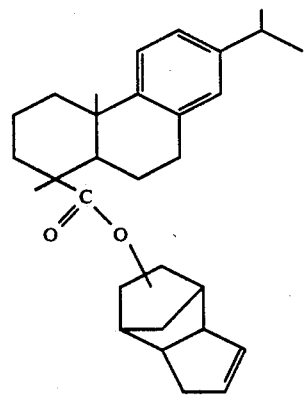

DETAILED DESCRIPTION OF THE INVENTION

There is also disclosed a process for preparing rubber compositions which comprises admixing (1) a rubber selected from the group consisting of natural rubber, rubbers derived from a diene monomer and mixtures thereof, with (2) a rosin acid derivative of the formula:

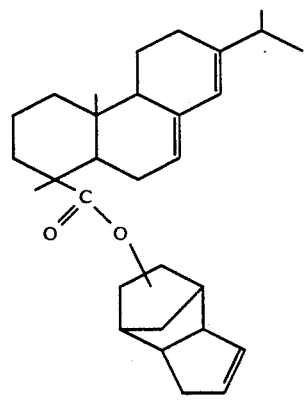

and

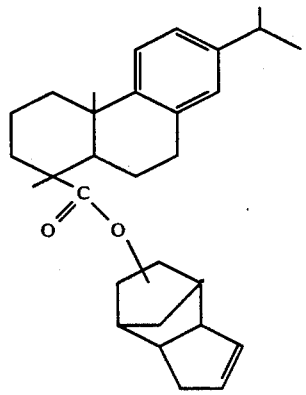

There is also disclosed a rubber composition which comprises (1) a rubber selected from the group consisting of natural rubber, homopolymers of conjugated diolefins, copolymers of conjugated diolefins and ethylenically unsaturated monomers or mixtures thereof and (2) a dicyclopentadiene alcohol rosin acid derivative of the formula:

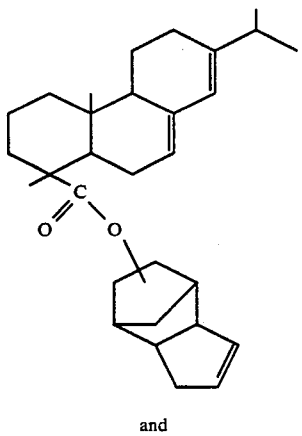

and

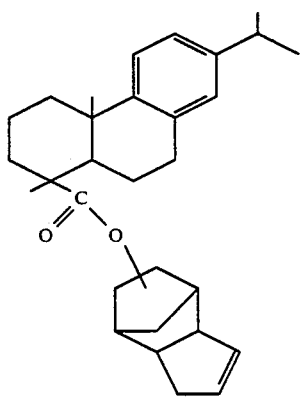

The dicyclopentadiene alcohol rosin acid derivative is prepared by reacting dicyclopentadiene alcohol with abietic acid or dehydroabietic acid. Abietic acid and dehydroabietic acid are derived from rosin. Rosin is a solid resinous material that occurs naturally in pine trees. The three major sources of rosin are gum rosin, wood rosin and tall oil rosin. Gum rosin is from the oleoresin extrudate of the living pine tree. Wood rosin is from the oleoresin contained in the aged stumps. Tall oil rosin is from the waste liquor recovered as a by-product in the Kraft paper industry.

The aged virgin pine stump is the source of wood rosin. The stump is allowed to remain in the ground for about ten years so that its bark and sapwood may decay and slough off to leave the heartwood rich in resin. It is known that production of pine stump rosin can be artificially stimulated by injecting the herbicide, Paraquat, into the lower portion of the tree. This treatment of the stump produces Pinex ® rosin.

Rosins derived from both oleoresin and aged stump wood are composed of approximately 90% resin acids and 10% nonacidic components. Chemical treatment of rosins, such as hydrogenation, dehydrogenation, or polymerization are known which produce modified resins.

Rosin acids are monocarboxylic acids having the typical molecular formula, $C_{20}H_{30}O_2$. The two major rosin acids that may be used to prepare the dicyclopentadiene alcohol rosin acid derivative are abietic acid of the structural formula:

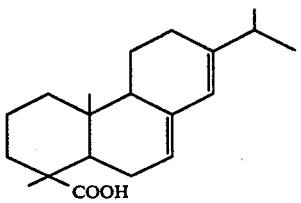

and dehydroabietic acid, having the structural formula:

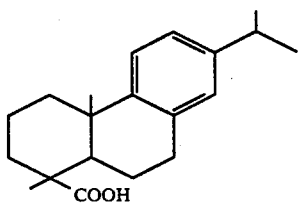

These acids are generally in a mixture with various amounts of other rosin acids including levopimaric, neoabietic, palustric, tetrahydroabietic, pimaric, isopimaric, Δ-isopimaric, elliotinoic and sandaracopimaric. These acids can be used in combination with the abietic or dehydroabietic acid to form the compositions of the present invention. Therefore, in connection with the above formula, for the dicyclopentadiene alcohol resin acid derivative, the moiety derived from abietic acid or dehydroabietic acid may in addition be derived from levopimaric, neoabietic, palustric, tetrahydroabietic, pimaric, isopimaric, Δ-isopimaric, alliotinoic or sandaracopimaric acid.

The acid number for the rosin acid may vary. Generally the acid number ranges from about 160 to about 175. Preferably the acid number is below 170 with a range of from about 165 to about 168 being particularly preferred.

The rosin acid may be reacted with the dicyclopentadiene alcohol in a variety of mole ratios. Generally the mole ratio of rosin acid to dicyclopentadiene alcohol ranges from about 0.5 to about 2.0 with a range of from about 1.0 to about 1.5 being preferred.

An organic solvent may be used to dissolve the rosin acid and the dicyclopentadiene alcohol. The solvent is preferably inert to the esterification reaction. Illustrative of solvents suitable for use to prepare the dicyclopentadiene alcohol rosin acid derivatives include: saturated and aromatic hydrocarbons, e.g., hexane, octane, dodecane, naphtha, decalin, tetrahydronaphthalene, kerosene, mineral oil, cyclohexane, cycloheptane, alkyl cycloalkane, benzene, toluene, xylene, alkyl-naphthalene, and the like; ethers such as tetrahydrofuran, tetrahydropyran, diethylether, 1,2-dimethoxybenzene, 1,2-diethoxybenzene, the mono and dialkylethers of ethylene glycol, propylene glycol, butylene glycol, diethylene glycol, dipropylene glycol, oxyethyleneoxypropylene glycol, and the like; fluorinated hydrocarbons that are inert under the reaction conditions such as perfluoroethane, monofluorobenzene, and the like. Another class of solvents are sulfones such as dimethylsulfone, diethylsulfone, diphenolsulfone, sulfolane, and the like. Mixtures of the aforementioned solvents may be employed so long as they are compatible with each other under the conditions of the reaction and will adequately dissolve the rosin acid, dissolve the alcohol and not interfere with the esterification reaction.

The esterification reaction may be conducted in the presence of a catalyst to speed up the reaction. Examples of catalysts that may be used include acid catalysts such as sulfuric acid, hydrochloric acid and toluenesulfonic acid. The amount of catalyst that may be used will vary depending on the particular catalyst that is selected. Generally speaking, from about 5% to about 10% by weight of the rosin acid is recommended.

The esterification reaction may be conducted over wide temperatures. The temperatures may range from moderate to an elevated temperature. In general, the esterification reaction may be conducted at a temperature of between about 150° C. to about 300° C. The preferred temperature range is from about 160° C. to about 190° C., while the most preferred temperature range is from about 165° C. to about 170° C.

The esterification reaction may be conducted under a variety of pressures. Pressures ranging from about 0 psig to about 100 psig may be used to conduct the esterification reaction.

The esterification reaction is conducted for a period of time sufficient to produce the desired rosin acid derivatives. In general, the reaction time can vary from minutes to several hours. If the more sluggish reaction conditions are selected, then the reaction time will have to be extended until the desired product is produced. It is appreciated that the residence time of the reactants will be influenced by the reaction temperature, concentration and choice of catalyst, total gas pressure, partial pressure exerted by its components, concentration and choice of solvent, and other factors. Desirably, the esterification reaction is conducted until the acid number of the products range from about 5 to about 30.

The process for the preparation of the rosin acid derivatives may be carried out in a batch, semi-continuous or continuous manner. The esterification reaction may be conducted in a single reaction zone or in a plurality of reaction zones, in series or in parallel. The reaction may be conducted intermittently or continuously in an elongated tubular zone or in a series of such zones. The material of construction of the equipment should be such as to be inert during the reaction. The equipment should also be able to withstand the reaction temperatures and pressures. The reaction zone can be fitted with internal and/or external heat exchangers to control temperature fluctuations. Preferably, an agitation means is available to ensure the uniform reaction. Mixing induced by vibration, shaker, stirrer, rotating, oscillation, etc. are all illustrative of the types of agitation means which are contemplated for use in preparing the composition of the present invention. Such agitation means are available and well known to those skilled in the art.

The rosin acid derivatives may be used in a wide variety of proportions in the rubber and may be a substitute, in whole or part for conventional extender or process oils. By the term "extender or process oils", it is meant oils such as aromatic oils, naphthenic oils, paraffinic oils and the like as well as blends thereof. Specific examples of such oils include those largely composed of naphthenic and alkylated naphthenic hydrocarbons and mixtures thereof with various aromatic hydrocarbons. Such oils may be obtained from the high boiling fractions of the so-called naphthenic or mixed crude oils. They may comprise distillate fractions boiling above about 200° C. Suitable fractions are those at least 90 percent of which boil above about 250° C. as more volatile members may be lost during or after compounding and curing the rubber. Generally, the level of rosin acid derivatives that may be added to the rubber composition may range from about 0.5 phr (parts per hundred rubber) to about 50 phr. Preferably the amount of rosin acid derivatives that is added ranges from about 1.0 phr to about 35 phr.

Examples of rubbers include substituted and unsubstituted, saturated and unsaturated, natural and synthetic polymers. The natural polymers include natural rubber in its various forms, e.g., pale crepe and smoked sheet, and balata and gutta percha. The synthetic polymers are derived from a diene monomer and include those prepared form a single monomer (homopolymer) or a mixture of two or more copolymerizable monomers (copolymer) when the monomers are combined in the random distribution or block form. The monomers may be substituted or unsubstituted and may possess one or more double bonds, conjugated and nonconjugated dienes and monoolefins, including cyclic and acyclic monoolefins, especially vinyl and vinylidene monomers. Examples of conjugated dienes are 1,3 butadiene, isoprene, chloroprene, 2-ethyl-1,3-butadiene, 2,3-dimethyl-1,3-butadiene and piperylene. Examples of nonconjugated dienes are 1,4-pentadiene, 1,4-hexadiene, 1,5-hexadiene, dicyclopentadiene, 1,5-cyclooctadiene, and ethyldiene norbornene. Examples of acyclic monoolefins are ethylene, propylene, 1-butene, isobutylene, 1-pentene and 1-hexene. Examples of cyclic monoolefins are cyclopentene, cyclohexene, cycloheptene, cyclooctene and 4-methyl-cyclooctene. Examples of vinyl monomers are styrene, acrylonitrile, acrylic acid, ethylacrylate, vinyl chloride, butylacrylate, methyl vinyl ether, vinyl acetate and vinyl pyridine. Examples of vinylidene monomers are alpha-methylstyrene, methacrylic acid, methyl methacrylate, itaconic acid, ethyl methacrylate, glycidyl methacrylate and vinylidene chloride. Representative examples of the synthetic polymers used in the practice of this invention are polychloroprene homopolymers of a conjugated 1,3-diene such as isoprene and butadiene, and in particular, polyisoprenes and polybutadienes having essentially all of their repeat units combined in a cis-1,4-structure; and copolymers of a conjugated 1,3-diene such as isoprene and butadiene with up to 50% by weight of at least one copolymerizable monomer, including ethylenically unsaturated monomers such as styrene or acrylonitrile; and butyl rubber, which is a polymerization product of a major proportion of a monoolefin and a minor proportion of a diolefin such as butadiene or isoprene.

The rubber compounds which may be modified by the resins of the present invention are preferably cis-1,4-polyisoprene (natural or synthetic), polybutadiene, polychloroprene and the copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

As known to one skilled in the art, in order to cure a rubber stock, one needs to have a sulfur vulcanizing agent. Examples of suitable sulfur vulcanizing agents include elemental sulfur (free sulfur) or a sulfur donating vulcanizing agent, for example, an amine disulfide, polymeric polysulfide or sulfur olefin adducts. Preferably, the sulfur vulcanizing agent is elemental sulfur. The amount of sulfur vulcanizing agent will vary depending on the components of the rubber stock and the particular type of sulfur vulcanizing agent that is used.

Conventional rubber additives may be incorporated in the rubber stock of the present invention. The additives commonly used in rubber stocks include fillers, plasticizers, processing oils, retarders, antiozonants, antioxidants and the like. The total amount of filler that may be used may range from about 30 to about 80 phr, with a range of from about 45 to about 70 phr being preferred. Fillers include silicas, clays, calcium carbonate, calcium silicate, titanium dioxide and carbon black. HAF Black (N-330) and GPF-Black (N-660) are commonly used in rubber stocks intended for use as wire coats or carcass ply coats. Preferably, at least a portion of the filler is carbon black. Plasticizers are conventionally used in amounts ranging from about 2 to about 50 phr with a range of about 5 to about 30 phr being preferred. The amount of plasticizer used will depend upon the softening effect desired. Examples of suitable plasticizers include aromatic extract oils, petroleum softeners including asphaltenes, saturated and unsaturated hydrocarbons and nitrogen bases, coal tar products, cumarone-indene resins and esters, such as dibutylphthalate and tricresyl phosphate. Materials used in compounding which function as an accelerato-ractivator includes metal oxides such as zinc oxide, magnesium oxide and litharge which are used in conjunction with acidic materials such as fatty acid, for example, stearic acid, oleic acid, murastic acid, and the like. The amount of the metal oxide may range from about 1 to about 10 phr with a range of from about 2 to about 8 phr being preferred. The amount of fatty acid which may be used may range from about 0.25 phr to about 5.0 phr with a range of from about 0.5 phr to about 2 phr being preferred.

Accelerators are conventionally used to control the time and/or temperature required for vulcanization and to improve the properties of the vulcanizate. In some instances, a single accelerator system may be used, i.e., primary accelerator. Conventionally, a primary accelerator is used in amounts ranging from about 0.5 to 2.0 phr. In another instance, combinations of two or more accelerators may be used which may consist of a primary accelerator which is generally used in the large amount (0.5 to 2.0 phr), and a secondary accelerator which is generally used in smaller amounts (0.01-0.50 phr) in order to activate and to improve the properties of the vulcanizate. Combinations of these accelerators have been known to produce a synergistic effect of the final properties and are somewhat better than those produced by use of either accelerator alone. In addition, delayed action accelerators may be used which are not affected by normal processing temperatures but produce satisfactory cures at ordinary vulcanization temperatures. Suitable types of accelerators that may be used include amines, disulfides, guanidines, thioureas, thiazoles, thiurams, sulfenamides, dithiocarbamates and xanthates. Preferably, the primary accelerator is a sulfenamide. If a secondary accelerator is used, the secondary accelerator is preferably a guanidine, dithiocarbamate or thiuram compound.

A class of compounding materials known as scorch retarders are commonly used. Phthalic anhydride, salicyclic acid, sodium acetate and N-cyclohexyl thiophthalimide are known retarders. Retarders are generally used in an amount ranging from about 0.1 to 0.5 phr.

Preformed phenol-formaldehyde type resins which may be used in the rubber stock and are generally present in an amount ranging from about 1.0 to about 5.0 phr, with a range of from about 1.5 to about 3.5 phr being preferred.

Conventionally, antioxidants and some times antiozonants, hereinafter referred to as antidegradants, are added to rubber stocks. Representative antidegradants include monophenols, bisphenols, thiobisphenols, polyphenols, hydroquinone derivatives, phosphites, thioesters, naphthyl amines, diphenyl-p-phenylenediamines, diphenylamines and other diaryl amine derivatives, para-phenylenediamines, quinolines and mixtures thereof. Specific examples of such antidegradants are disclosed in The Vanderbilt Rubber Handbook (1990), pages 282-286. Antidegradants are generally used in amounts from about 0.25 to about 5.0 phr with a range of from about 1.0 to about 3.0 phr being preferred.

The present invention may be better understood by reference to the following examples in which the parts or percentages are by weight unless otherwise indicated.

The rubber stocks containing the rosin acid derivatives may be used in the preparation of tires, motor mounts, rubber bushings, power belts, printing rolls, rubber shoe heels and soles, rubber floor tiles, caster wheels, elastomer seals and gaskets, conveyor belt covers, wringers, hard rubber battery cases, automobile floor mats, mud flaps for trucks, ball mill liners, and the like.

Example 1

300 grams (1.0 mole) of tall oil rosin (crude abietic acid) with an acid number of 165 and 225 grams (1.5 mole) of dicyclopentadiene mono alcohol were added to 22 grams of toluenesulfonic acid in 260 ml of m-xylene. The mixture was added to a 3-neck, 1-liter flask equipped with a Dean.Stark trap, reflux condenser, heating mantle and a pot thermometer. After 2.5 hours at a pot temperature of 160° C. with reflux, 33 ml of water was removed. After vacuum-oven drying at 100° C., 520 grams of product was isolated. The product had a melting point of 77°-78° C.

Example 2

Rubber compositions containing the materials set out in Table I were prepared in a BR Banbury using two separate stages of addition. The processing oils (naphthenic/paraffinic oil, or dicyclopentadiene alcohol rosin acid derivative) were added to the Banbury during the first stage of mixing. The rosin acid derivative was prepared in accordance with Example 1. Table II below sets out the cure behavior and vulcanizate properties for the control (containing the naphthenic/paraffinic oil) and the compound containing the dicyclopentadiene alcohol rosin acid derivative.

TABLE I

| Material | Weight Parts | Banbury Stage |
|---|---|---|
| Natural Rubber | 40.00 | 1 |
| BUD 1207 ® [1] | 60.00 | 1 |
| Carbon Black | 50.00 | 1 |
| Antiozonant/Antioxidant | 4.00 | 1 |
| Rosin/Fatty Acids | 3.00 | 1 |
| Wax | 1.50 | 1 |
| Zinc Oxide | 3.00 | 1 |
| Tackifier | 4.00 | 1 |
| Processing Oil[2] | 5.00 | 1 |

TABLE I-continued

| Material | Weight Parts | Banbury Stage |
|---|---|---|
| Sulfur/Accelerator | 2.60 | 2 |

[1] A high cis-1,4-polybutadiene rubber commercially available from The Goodyear Tire & Rubber Company.
[2] Naphthenic/paraffinic oil or dicyclopentadiene alcohol rosin acid derivative.

Cure properties were determined using a Monsanto oscillating disc rheometer which was operated at a temperature of 150° C. and at a frequency of 11 hertz. A description of oscillating disc rheometers can be found in the Vanderbilt Rubber Handbook edited by Robert O. Babbit (Norwalk, Connecticut, R. T. Vanderbilt Company, Inc., 1978), pages 583-591. The use of this cure meter and standardized values read from the curve are specified in ASTM D-2084. A typical cure curve obtained on an oscillating disc rheometer is shown in page 588 of the 1978 edition of the Vanderbilt Rubber Handbook.

In such an oscillating disc rheometer, compounded rubber samples are subjected to an oscillating shearing action of constant amplitude. The torque of the oscillating disc embedding in the stalk that is being tested that is required to oscillate the rotor at the vulcanization temperature is measured. The values obtained using this cure test are very significant since changes in the rubber or the compounding recipe are very readily detected.

The following table reports cure properties that were determined from cure curves that were obtained for the two rubber formulations that were prepared. These properties include a torque minimum (Min Torque), a torque maximum (Max Torque), minutes to 25% of the torque increase (t25 min.), and minutes to 90% of the torque increase (t90 min.).

Peel adhesion testing was done to determine the interfacial adhesion between various rubber formulations that were prepared. The interfacial adhesion was determined by pulling one compound away from another at a right angle to the untorn test specimen with the two ends being pulled apart at a 180° angle to each other using an Instron machine. The area of contact was determined from placement of a Mylar sheet between the compounds during cure. A window in the Mylar allowed the two materials to come into contact with each other during testing.

TABLE II

| Cure Behavior and Vulcanizate Properties | | |
|---|---|---|
| | Processing Oil (Control) | Rosin Derivative of Example 1 |
| Rheometer, 150° C. | | |
| Max. Torque (min.) | 31.7 | 32.6 |
| Min. Torque (min.) | 8.4 | 8.8 |
| t 90 (min.) | 25.7 | 34.0 |
| t 25 (min.) | 9.5 | 9.9 |
| Stress Strain | | |
| Tensile Strength (MPa) | 13.5 | 13.7 |
| Elongation @ Break (%) | 640 | 652 |
| 300% Modulus, (MPa) | 5.5 | 6.3 |
| Peel Adhesion, 95° C. to Itself, Newtons | 93 | 112 |
| Zwick Rebound | | |
| 100° C. (%) | 61.0 | 61.9 |
| Room Temperature (%) | 55.7 | 55.8 |
| Stat Ozone[1] (25% Strain) | | |
| Lower, Orig | C4 | 0 |
| Upper | A1 | 0 |
| Lower, Aged | A3 | A1 |
| Upper | A1 | 0 |
| Dynamic, Orig (25% Strain) | E | E |
| Aged | E | E |
| Cyc Ozone[2] (Orig) | | |
| 6 days | 1-0 | 1-0 |
| 10 days | 2-1 | 2-1 |
| 13 days | 4-10 | 4-3 |
| 17 days | B | 4-12 |
| 21 days | | B |
| Cyc Ozone[2] (Aged @ 70° C.) | | |
| 2 days | 0 | 0 |
| 6 days | ½-0 | ½ 0 |
| 10 days | 3-1 | 1-0 |
| 13 days | B | 4-2 |
| 16 days | | B |

[1] Static

| 0 = No cracking | F = Complete Failure |
|---|---|
| Number of cracks | Size of cracks |
| A = very few (less than ¼ surface) | 1 = small (hairline) |
| B = few (¼ to ½ surface) | 2 = medium |
| C = moderate (½ to ¾ surface) | 3 = large |
| D = heavy (¾ to all surfrace) | 4 = severe (open) |
| E = edge cracking only | |

[2] Cycle D3394 - using a cycled ozone on/off procedure

| Density | Severity |
|---|---|
| 0 = none | 0 = none |
| ½ = edge | 1 = .01 in. |
| 1 = ¼ surface | 3 = .03 in. |
| 2 = ½ surface | 5 = .10 in. |
| 3 = ¾ surface | 10 = .25 in. |
| 4 = ¾ surface | 12 = +.25 in. |
| 15 = broken. | |

The dicyclopentadiene alcohol rosin acid derivative containing rubber compound exhibits cure behavior, stress-strain properties and peel adhesion to itself similar to the control rubber compound containing processing oil. The rosin acid derivative containing rubber compound exhibits improved static ozone resistance and superior cyclic ozone resistance when compared to the control. This result is unexpected but highly desirable in cured rubber compositions.

Example 3

Rubber compositions containing the materials set out in Table III were prepared in a BR Banbury using two separate stages of addition. The wax or dicyclopentadiene alcohol rosin acid derivative was added to the Banbury during the first stage of mixing. The rosin acid derivative was prepared in accordance with Example 1.

TABLE III

| Material | Weight Parts | Banbury Stage |
|---|---|---|
| Natural Rubber | 40.00 | 1 |
| BUD 1207 ® [1] | 60.00 | 1 |
| Carbon Black | 50.00 | 1 |
| Antiozonant/Antioxidant | 4.00 | 1 |
| Rosin/Fatty Acids | 3.00 | 1 |
| Wax[2] or Rosin Acid Derivative of Example 1 | 1.50 | 1 |
| Zinc Oxide | 3.00 | 1 |
| Tackifier | 4.00 | 1 |
| Processing Oil | 5.00 | 1 |
| Sulfur/Accelerator | 2.60 | 2 |

[1] A high cis-1,4-polybutadiene rubber commercially available from The Goodyear Tire & Rubber Company.
[2] Mixture of microcrystalline wax and paraffinic wax.

Table IV below sets out the cure behavior and vulcanizate properties for the control and the compound containing the dicyclopentadiene alcohol rosin acid derivative.

TABLE IV

| Cure Behavior and Vulcanizate Properties | | |
|---|---|---|
| | Wax (Control) | Rosin Derivative of Example 1 |
| Rheometer, 150° C. | | |
| Max. Torque (min.) | 33.2 | 33.6 |
| Min. Torque (min.) | 9.0 | 9.0 |
| t 90, (min.) | 21.6 | 24.6 |
| t 25, (min.) | 8.0 | 8.4 |
| Stress Strain | | |
| Tensile Strength, (MPa) | 13.0 | 13.1 |
| Elongation at Break, (%) | 574 | 584 |
| 300% Modulus, (MPa) | 6.36 | 6.36 |
| 100% Modulus, (MPa) | 1.56 | 1.57 |
| Peel Adhesion 95° C. to Itself, Newtons | 88 | 95 |
| Zwick Rebound | | |
| 100° C., (%) | 65.9 | 64.7 |
| Room Temperature (%) | 57.7 | 57.3 |
| Cyc Ozone (Original) | | |
| 3 days | 0 | 0 |
| 5 days | ½-0 | ½-1 |
| 14 days | 3-2 | 4-1 |
| 17 days | 4-10 | 4-2 |
| 21 days | B | B |
| Cyc Ozone (Aged @ 70° C.) | | |
| 4 days | 0 | 0 |
| 7 days | ½-0 | ½ 1 |
| 9 days | 2/1 | 2/1 |
| 10 days | 3/1 | 2/1 |
| 15 days | B | 2/1 |
| 17 days | | 4/10 |
| 18 days | | B |

The dicyclopentadiene alcohol rosin acid derivative containing rubber compound exhibits cure behavior, stress-strain properties and peel adhesion to itself similar to the control rubber compound containing processing oil. The rosin acid derivative containing rubber compound exhibits superior cyclic ozone resistance when compared to the control. This result is unexpected but highly desirable in cured rubber compositions.

What is claimed is:

1. A rosin acid derivative of the structural formula:

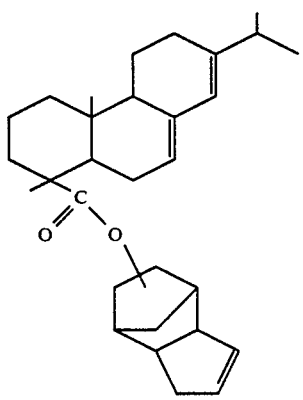

and

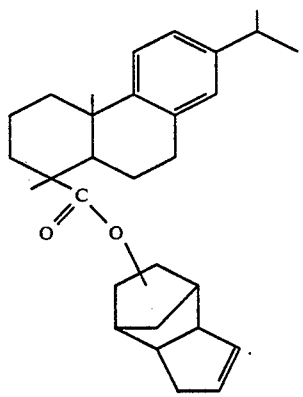

2. A process for preparing rubber compositions which comprises admixing the rosin acid derivative of claim 1 with a rubber selected from the group consisting of natural rubber, rubbers derived from a diene monomer and mixtures thereof.

3. The process for preparing rubber compositions according to claim 2 wherein the rosin acid derivative is at a concentration of from about 0.5 parts per hundred rubber to 50 parts per hundred rubber and is in an intimate mixture with said rubber.

4. The process for preparing rubber compositions according to claim 3 wherein the rosin acid derivative is at a concentration of from about 1.0 to 35 parts per hundred rubber.

5. The rosin acid derivative of claim 1 wherein said composition is added to a rubber selected from the group consisting of natural rubber, rubbers derived from a diene monomer and mixtures thereof.

6. The rosin acid derivative of claim 5 wherein said derivative is at a concentration of from about 0.5 parts per hundred rubber to 50 parts per hundred rubber.

7. The rosin acid derivative of claim 6 wherein said derivative is at a concentration of from about 1.0 to 35 parts per hundred rubber.

8. The rosin acid derivative of claim 1 wherein in addition to abietic acid and dehydroabietic acid, the rosin acid moiety is also derived from the group consisting of levopimaric acid, neoabietic acid, palustric acid, Δ-isopimaric acid, tetrahydroabietic acid, pimaric acid, isopimaric acid, elliotinoic acid, sandaracopimaric acid and mixtures thereof.

9. The process for preparing rubber compositions according to claim 2 wherein said rubber is selected from the group consisting of cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene, natural rubber and blends thereof.

10. The process for preparing rubber compositions according to claim 9 wherein said rubber compound in natural rubber.

11. The rosin acid derivative of claim 5 wherein said rubber is selected from the group consisting of natural rubber, synthetic cis-1,4-polyisoprene, polybutadiene, polychloroprene, copolymers of isoprene and butadiene, copolymers of acrylonitrile and butadiene, copolymers of acrylonitrile and isoprene, copolymers of styrene, butadiene and isoprene, copolymers of styrene and butadiene and blends thereof.

12. The rosin acid derivative of claim 11 wherein said rubber compound is natural rubber.

* * * * *